UNITED STATES PATENT OFFICE.

JAMES ROBERTSON, OF NEW YORK, N. Y.

IMPROVED PORTABLE WATER-CLOSET.

Specification forming part of Letters Patent No. 33,494, dated October 15, 1861.

*To all whom it may concern:*

Be it known that I, JAMES ROBERTSON, of the city, county, and State of New York, have invented a new and Improved Portable Water-Closet; and I do hereby declare that the following is a full, clear, and exact description of the same, reference being had to the annexed drawings, making a part of this specification, in which—

Figure 1:
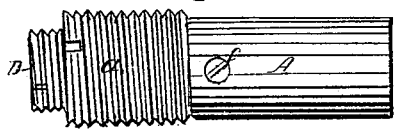
Figure 2:
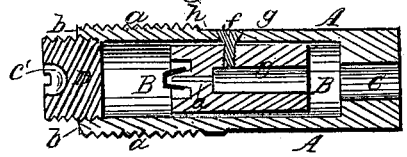
Figure 3:
Figure 5:
Figure 4:
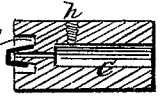

Figure 1 is a vertical central section of my invention, taken in the line $x$ $x$, Fig. 2; and Fig. 2, a vertical section of the same, taken in the line $y$ $y$, Fig. 1.

Similar letters of reference indicate corresponding parts in the two figures.

The object of this invention is to obtain a simple and efficient portable water-closet designed to supersede the ordinary chambers in use and to answer a purpose similar to those water-closets which are permanently placed in houses supplied with water under pressure.

The invention is applicable for ships and all vessels of navigation, as well as for general domestic use.

The invention consists in the employment or use of a pump and water-reservoir in connection with a basin and foul-chamber provided, respectively, with a water seal and pan, all arranged to operate substantially as hereinafter shown and described.

To enable those skilled in the art to fully understand and construct my invention, I will proceed to describe it.

A represents a rectangular box, which may be of wood, constructed of any suitable dimensions, with a lid B connected to it at one side by hinges. The box A is divided into two compartments C D by a vertical partition E. The compartment C is a water-reservoir and is lined with sheet metal $a$.

F is a pump placed vertically in the compartment C and having its piston-rod G pass through a concave socket $b$ in the top of the compartment C. The pump F is provided with an eduction-pipe H near its upper end, and this pipe extends over the top of the compartment D and has a curved end I attached to it by a swivel-joint or connection $c$. This curved end I is slotted near its outer end at its under side, as shown at $d$, and the outer end of I is connected by a link J to the under side of the lid K of the compartment D.

In the compartment D the foul-chamber L is placed. This foul-chamber may be of cylindrical form, and it is provided at its inner side, near its upper end, with a circumferential water-chamber M, formed by having a flange $e$, which is of curved form in its transverse section, secured to the inner side of the chamber L, as shown clearly in both figures.

N represents the basin, the upper part $f$ of which is of cylindrical form and the lower part $g$ of inverted conical form. The lower edge of part $f$ extends down a trifle below the upper part of $g$ and fits in the chamber M. The lower portion of part $f$ is perforated with holes $h$, which are just above the chamber M. The bottom of the basin N has a pan O underneath it, said pan being attached to one end of an arm P, which is hung on a pivot $i$, and has a weight or counterpoise Q at its outer end, the weight Q being a trifle heavier than the pan O in order that the latter when closed will be kept in place.

The operation is as follows: In using the closet the lid B is raised to a vertical position, the lid K of the compartment D being closed and having a proper seat-hole $j$ made in it. After use the occupant of the closet draws up the piston of pump F and water is ejected through the slot $d$ of pipe I into the basin N, the water washing out the excrement and effectually cleansing the basin, the pan O tilting, of course, and allowing the water to pass down into chamber L. Water also passes through the holes $h$ and keeps the chamber M filled with water, which forms a seal and effectually prevents any effluvia escaping from the chamber L. The occupant before rising from the seat depresses the piston of the pump, and a spring beneath it or connected to it in any proper way (see dotted lines) forces it up a short distance and causes enough water to be ejected from pipe I to form a seal for pan O. By connecting the seat K with the pipe I, as shown, the latter is raised or turned up as the seat K is elevated and the chamber L may be readily removed for emptying.

The device is simple and may be afforded at a moderate cost and made of quite moderate dimensions.

Having thus described my invention, what I claim as new and desire to secure by Letters Patent, is—

J. P. SCHENKL.
Shell-Fuse.

No. { 2,491, 33,495. }

Patented Oct. 15, 1861.

Witnesses.
F. R. Hale
J. B. Bampfrd

Inventor.
Jch. P. Schenkl.